United States Patent
Rand et al.

[11] Patent Number: 6,076,791
[45] Date of Patent: Jun. 20, 2000

[54] DEVICE FOR PLACING OF INFORMATION/ ADVERTISING WITH A BRACKET ON THE HANDLE OF A SHOPPING TROLLEY

[75] Inventors: Jan C. Rand, Osio; Harald Thorkildsen, Hosle, both of Norway

[73] Assignee: Cart AS, Horten, Norway

[21] Appl. No.: 08/930,275

[22] PCT Filed: Mar. 29, 1996

[86] PCT No.: PCT/NO96/00073

§ 371 Date: Sep. 29, 1997

§ 102(e) Date: Sep. 29, 1997

[87] PCT Pub. No.: WO96/30247

PCT Pub. Date: Oct. 3, 1996

[51] Int. Cl.[7] ............................................. A47B 96/06
[52] U.S. Cl. ................... 248/229.24; 248/230.5; 40/308; 280/33.992
[58] Field of Search ............... 248/214, 229.24, 248/227.4, 230.5, 231.61; 280/33.992, DIG. 4; 40/308, 312, 661.12

[56] References Cited

U.S. PATENT DOCUMENTS

| | | | |
|---|---|---|---|
| 1,350,275 | 8/1920 | Gafinowitz | 40/317 |
| 2,361,479 | 10/1944 | Joffo | 40/204 |
| 2,864,189 | 12/1958 | Campbell | 40/17 |
| 3,881,267 | 5/1975 | Hicks | 40/308 |
| 3,912,291 | 10/1975 | Frish | 280/33.99 A |
| 5,086,960 | 2/1992 | Schwietzer | 224/277 |
| 5,636,818 | 6/1997 | Edwards et al. | 248/214 |
| 5,806,217 | 9/1998 | Alvern | 40/299 |

FOREIGN PATENT DOCUMENTS 133235  2/1985  European Pat. Off. .

*Primary Examiner*—Derek J. Berger
*Assistant Examiner*—Gwendolyn Baxter
*Attorney, Agent, or Firm*—Nixon & Vanderhye

[57] ABSTRACT

A device for placing information/advertising on a shopping trolley comprises a support element with a display surface, and brackets which grip around the shopping trolley handle. The brackets are shaped like supports with ergonomically-shaped handles, and they protrude down and out from the underside or side edges of the support element.

10 Claims, 9 Drawing Sheets

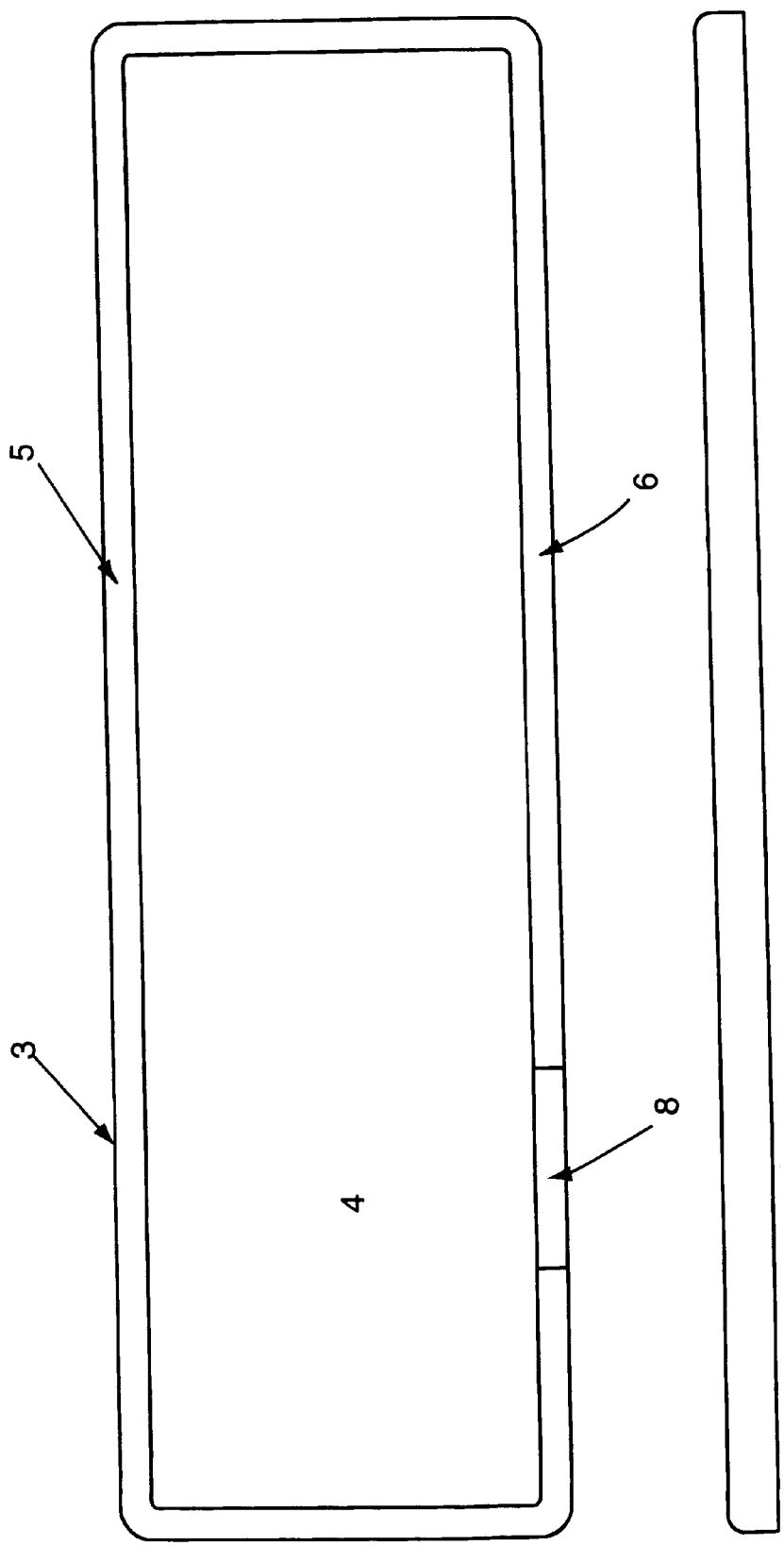

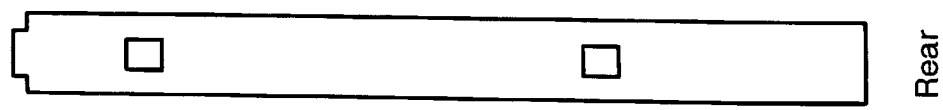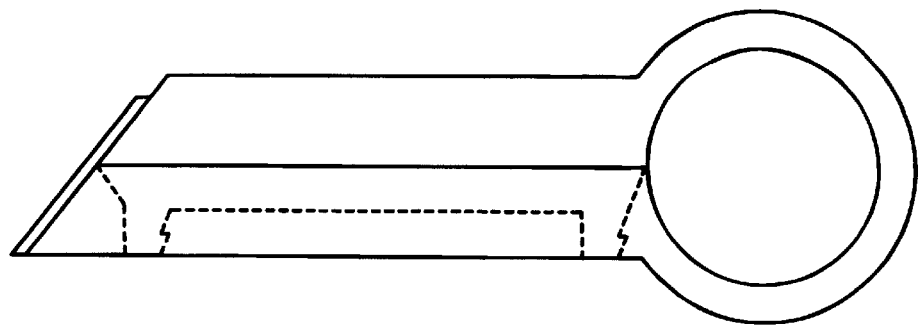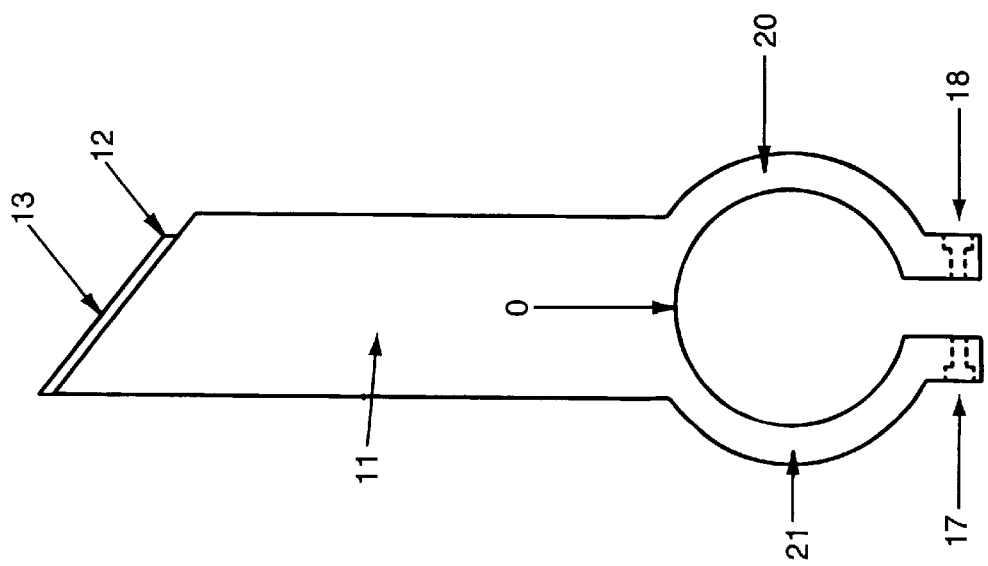

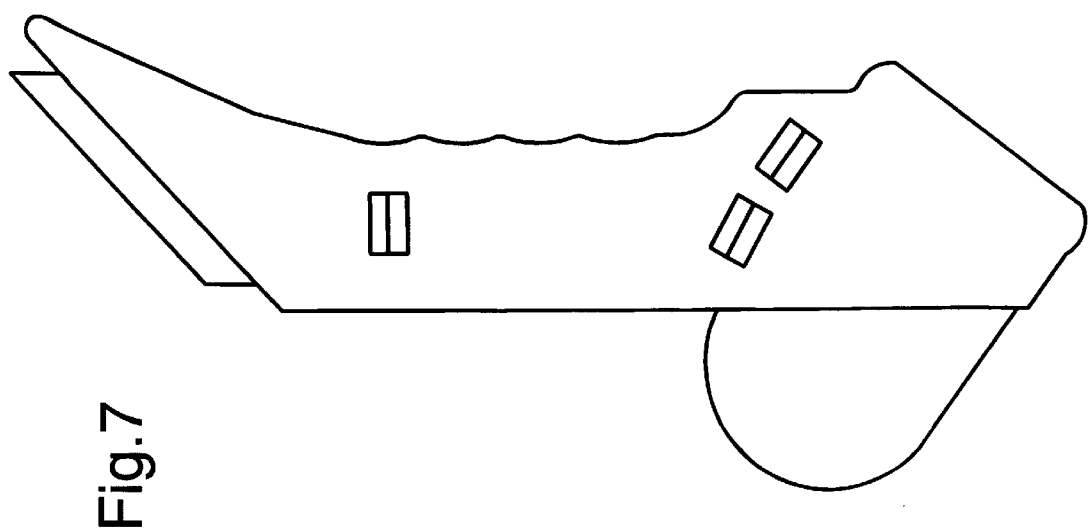
Fig.7
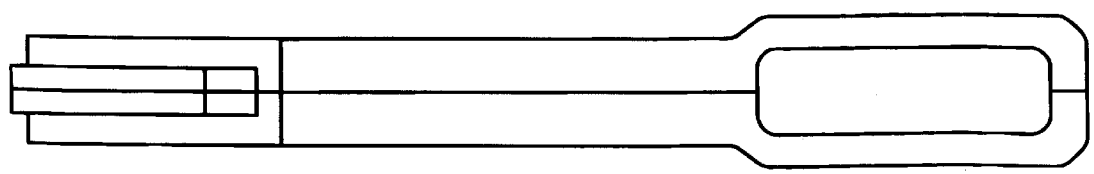

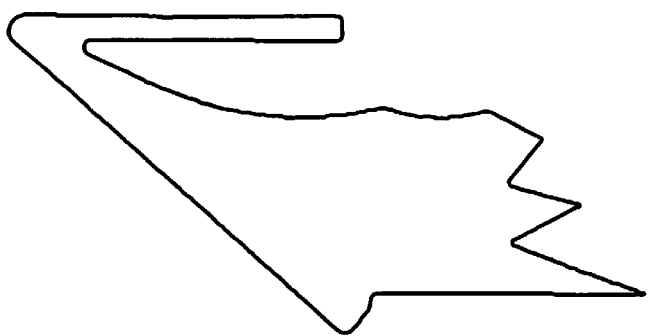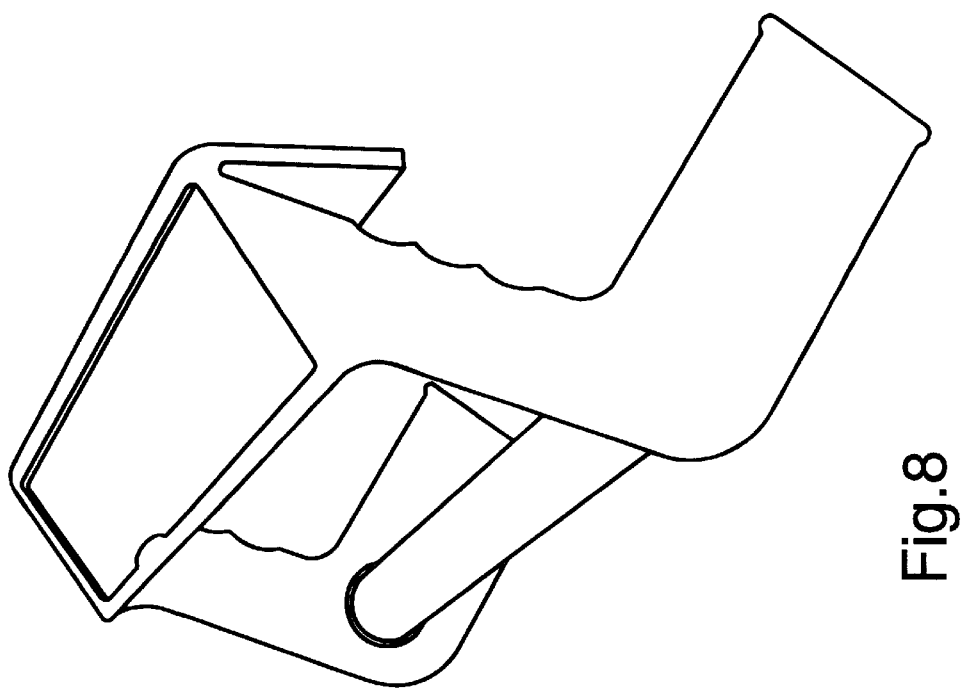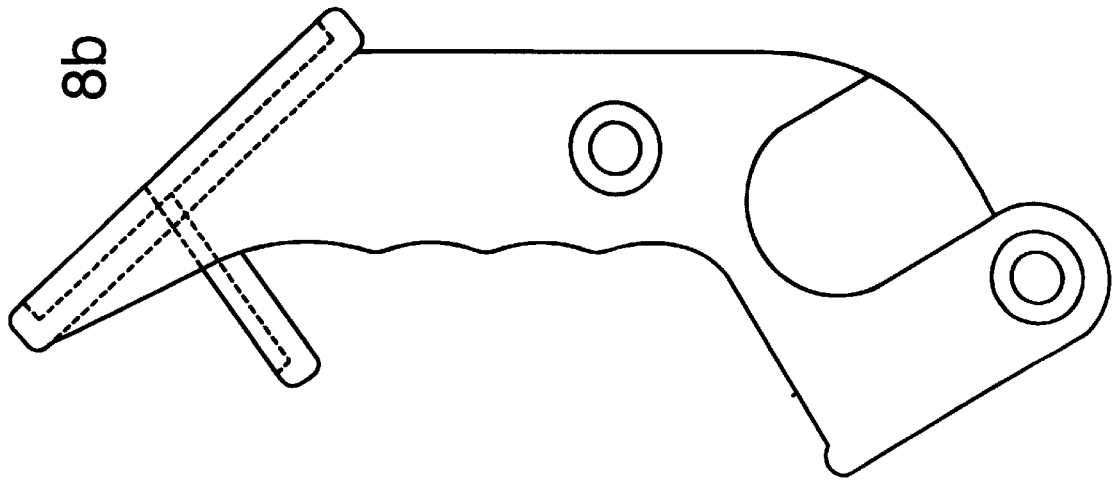
Fig.8

DEVICE FOR PLACING OF INFORMATION/ ADVERTISING WITH A BRACKET ON THE HANDLE OF A SHOPPING TROLLEY

BACKGROUND OF THE INVENTION

The present invention relates to a device for placing information/advertising with a bracket on or close to a shopping trolley's handle.

The present invention relates to a device for placing information/advertising on a shopping trolley which has a bar-like handle fastened to the trolley by fastening means. The device comprises an information support element having at least one information display surface for the mentioned information/advertising, and the device is equipped with at least one bracket gripping completely or partly around the shopping trolley handle, or this at least one bracket may be fixed directly to the trolley handle fastening means. Thus, the display surface is placed within an imaginary area around and parallel with the trolley's handle.

Placing information on or close to a shopping trolly handle is previously known from U.S. Pat. No. 4,513,983, which patent describes an eight sided rotatable cylinder placed over and horizontally in the full length of the shopping trolley, displaced forward in relation to the shopping trolley's handle. The design of the display area only makes it possible to read ⅛ of the display surface at any given time. One has to rotate the cylinder manually to be able to read the complete message. The limited display surface is thus of little value as an advertising medium.

U.S. Pat. Nos. 4,848,117 and 5,301,443 are differently shaped devices that are screwed directly onto the shopping trolley handle itself. This limits the shopper in making use of the whole handle to manoeuvre the trolley.

U.S. Pat. No. 3,251,543 describes a device with various functions with inter alia display surfaces for advertising and information. This surface is fastened over the trolley's handle in the full width of the trolley, with metal mouldings fixed to the trolley or the trolley handle. The metal mouldings are of no other practical use than to be a bracket. In order to fasten it, one needs to change the trolley's permanent bracket. Advertising or information is placed around the actual trolley handle. A logo or other information is fastened directly to the handle in the form of a plastic tube or sleeve which constitutes part of the actual handle. The display surface is identical to the handle's outer surface, and the available area for information and/or advertising is limited. The information is protected by a transparent plastic foil which makes frequent and simple changes of the message impossible. This can be solved by fastening the message on the outside of the handle, but this affects the ergonomical design of the handle and the permanent information fastened to the actual handle.

SUMMARY OF THE INVENTION

The purpose of the present invention is to provide a device for placing information/advertising in an area around (normally above) and parallel with the handle, and which does not limit, nor is restricted to, the exposure area on the handle itself.

The invention will further enable a frequent and simple change of information/advertising. The device will not hinder normal use of the trolley handle, but instead give the shopper additional possibilities for manoeuvering the trolley with the bracket (the two handles) which may be an advantage to some disabled persons.

A separate display surface with a space for both information and advertising, is thus provided by fastening a support element which has two brackets mounted thereto and which extends above and parallel with the trolley handle.

As stated in the following drawing description, the support element and the bracket may be designed as a hoop or a bar (bars), or as one or more moulded parts that are fastened to the handle itself or to the fastening means for the handle itself (FIG. 7), by suitable means such as by means of welding or a mechanical bracket (the extreme points of the rod, alternatively a moulded hoop or handle being ended by a flat area with a hole (eye) which is fastened to the handle fastening means with the aid of a screw and possibly a lock washer.

Alternatively the support element or the rod can be fastened to the actual trolley handle by means of a suitable clamping device or some other mechanical fastening device.

The invention can be divided into three areas: (1) A device for placing and protection of information/advertising, (2) a support element for the device, and (3) a bracket, which constitutes a steering handle.

The bracket, hereinafter referred to as the handles, is moulded and ergonomically shaped with the possibility for a mechanical fastening (screw or clamp) in one end of the shopping trolley handle, or to the means for fastening the trolley handle to the trolley and with a surface for welded/ glued or other suitable attachment for the support element, which in turn holds the device for placing information/ advertising, in the other end.

The support element with the two handles can of course be produced in one part.

The bracket (the handles) may be constituted by one, two or more parts which surround the handle and are held tight by means of a through screw or other suitable means of fastening.

Other features of the invention, and which will appear from the attached dependent claims, will be described in more detail in the following description of the invention with reference to the drawing.

BRIEF DESCRIPTION OF THE DRAWING FIGURES

In the drawing,

FIG. 1 shows an information support element with a display surface.

FIGS. 2a and 2b show two different brackets with mechanical screw device (FIG. 2a) and clamp device (FIG. 2b) for fastening to the shopping trolley handle, as well as an assembly or mounting rail for the support element.

FIGS. 2c and 2d are front and rear elevational views, respectively of the brackets illustrated in FIGS. 2a and 2b.

FIG. 7 shows an alternative design and placing of the bracket.

FIG. 8a is a prospective view of an embodiment hereof having two display surfaces;

FIG. 8b is a side elevational view of a further form of FIG. 8a which provides the display surface with a support element having improved stability and strength; and FIG. 8c is an enlarged fragmentary side elevational view of FIG. 8a.

DESCRIPTION OF A PREFERRED EMBODIMENT

Figure 3A:
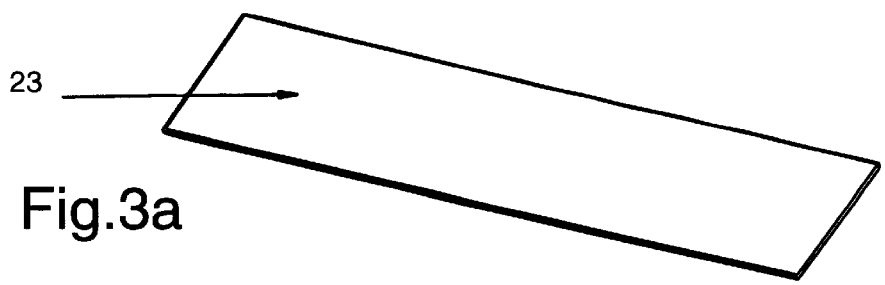
FIG. 3a shows an information and advertising sign adapted to the entire display surface.

FIG. 1 thus shows in perspective a flat support element 3 is with a display surface 4 surrounded by a protruding edge 5, creating a recess 6 for receiving a plastic moulding 7 (see FIG. 3) which is fastened with double-sided tape to the display surface 4. The recess 6 is lowered in the front edge 8 in such a manner that lifting of the plastic moulding top 10 becomes simple. The information/advertising sign is placed between the plastic moulding top 10 and bottom 9 (see FIG. 3).

The information support element, as described, can function as a device for information/advertising in itself. The information and advertising sign must then be laminated for protection against wafer and dust.

One can clearly see from the drawing that the support element and thus the information/advertising sign is elongate and approximately equal in length to the trolley handle itself, which handle extends parallel with the longitudinal direction of the shopping trolley handle.

FIG. 2a shows one of the two brackets that holds the support element 3 a minimal distance apart from the shopping trolley handle, without affecting the use of the trolley handle to any great extent. The bracket, also referred to as the handle 11, is moulded to provide a good and easy grip and steering ability. Since the handles can be mounted almost vertically in the longitudinal direction, persons with certain movement disabilities can more easily use these handles to seize the shopping trolley when they stand at the side of the trolley, and in addition by pushing forward and steering to both sides.

The top surface 12 of the handle is designed for good and firm contact with the support element 3. With the support element 3 fixedly mounted, the top surface 12 and the flat side of the support element 3 will stand in angles of varying degrees, dependent on the construction of the shopping trolley, with reference to the longitudinal direction of handle 11 (see FIG. 2a/2b). Thus the handle 11 when assembled on the shopping trolley handle will have the support element 3 with display surface 4 in an optimum angle for reading the information placed in the plastic moulding 7, at the same time as the thumb gets a good and natural rest against the support element 3 when one holds around the handle with the other fingers and the palm of the hand.

The length of the handle will be adjusted to the design of the shopping trolley in such a manner that the rear wall of the shopping trolley, including a projection for a children's seat and a beer crate holder, will clear the support element 3 when the rear wall is pushed forward and up, which happens when several shopping trolleys are parked close to each other or in each other.

The handle 11 and the support element 3 will be assembled together by common moulding (in one piece) or by welding, glue and/or mechanical attachment. Joining a separate handle 11 and the support element 3 can also take place by giving both parts a special design, one such design being shown as an example in FIG. 4. The top surface 12 of the handle has, as shown in the drawing, a rail 13 having a 4 mm bottom width and 6 mm with on top, cooperating with a complementary track 14 in the support element 3. The rail 13 extend from the inner upper edge of the top surface 12, parallel to the longitudinal direction of the top surface, and finishes 2 mm from the outer edge of the top surface. Similarly, rail 13 can be pushed into the track 14 with the exact opposite appearance thereby obtaining a connection between the handle and the support element that is robust, stable and durable.

Figure 4:
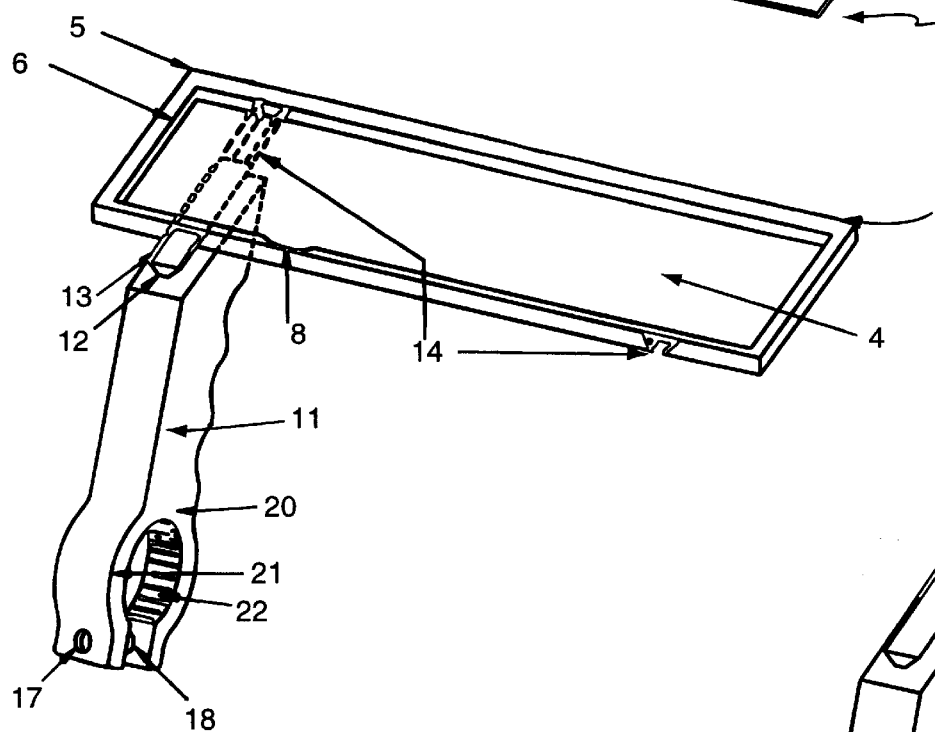
FIG. 4 shows an embodiment with the information support element that holds the device for information/ advertising in place together with one bracket part-way attached to the information support element.
Figure 5:
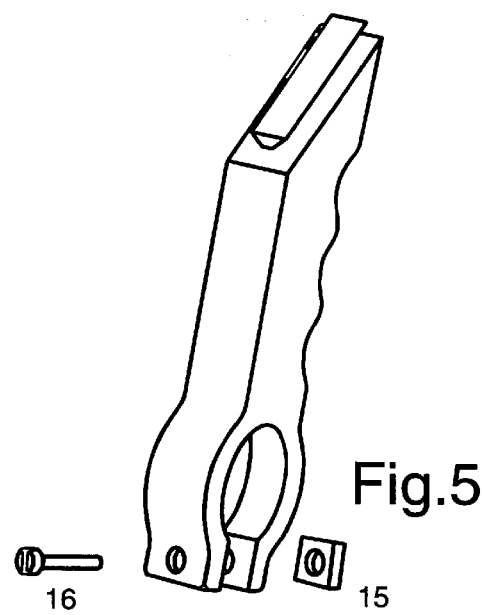
FIG. 5 shows the bracket (FIG. 2a) in perspective.

Mounting of the handle to the shopping trolley handle or to the fastening means on the shopping trolley handle, is done by means of screw devices and/or clamp devices. FIGS. 4 and 5 show that the lower part of the handle 11 is specially designed to enable it to be threaded over and around the shopping trolley handle and get clamped into position with the aid of a screw 16 and nut 15 which are led through two holes 17 and 18 in the handle and transverse to the end pieces. Each one of the two end pieces 20 and 21 which shut tight around the shopping trolley handle can be equipped with cross running grooves 22 to contribute to secure a firm grip of the shopping trolley handle when the screw 16 clamps the two end pieces 20 and 21 together.

Figure 3:
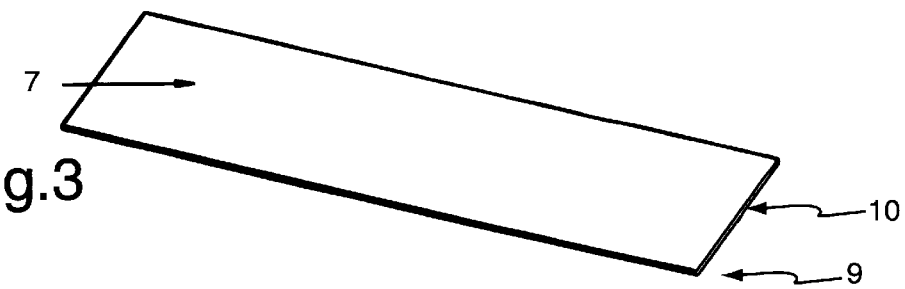
FIG. 3 shows a device for information/advertising in the form of a transparent plastic moulding for placing of information/advertising.

The advertising/information sign or strip 23 as shown in FIG. 3a is placed between the two surfaces 10 and 9 of the plastic moulding in whatever appropriate manner. To obtain an easy change and simultaneous protection of the information/advertising strip 23, the solution in accordance with FIG. 1 and 3 is desirable. In this manner the strip is placed inside the plastic moulding which is fastened with double-sided tape or other suitable adhesive in the down-levelled area referred to as the display surface 4.

Figure 6:
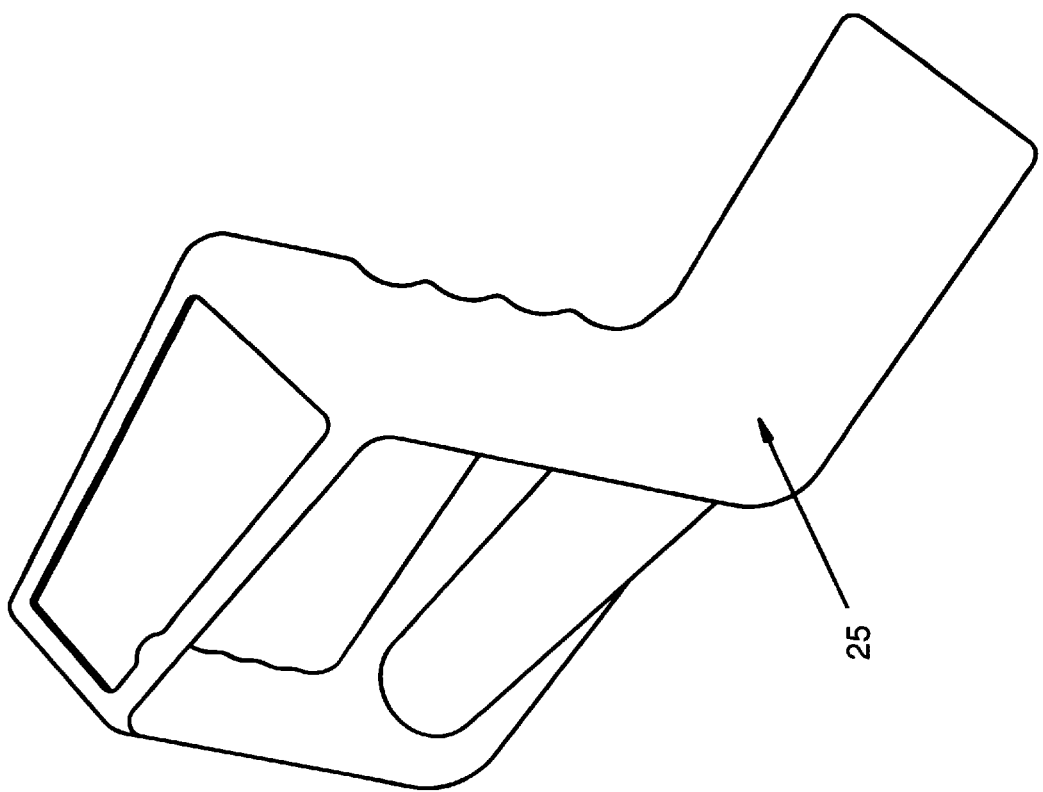
FIG. 6 shows another embodiment of the support element and bracket as well as the fastening means for the shopping trolley handle shaped as one moulded part.
Figure 6A:
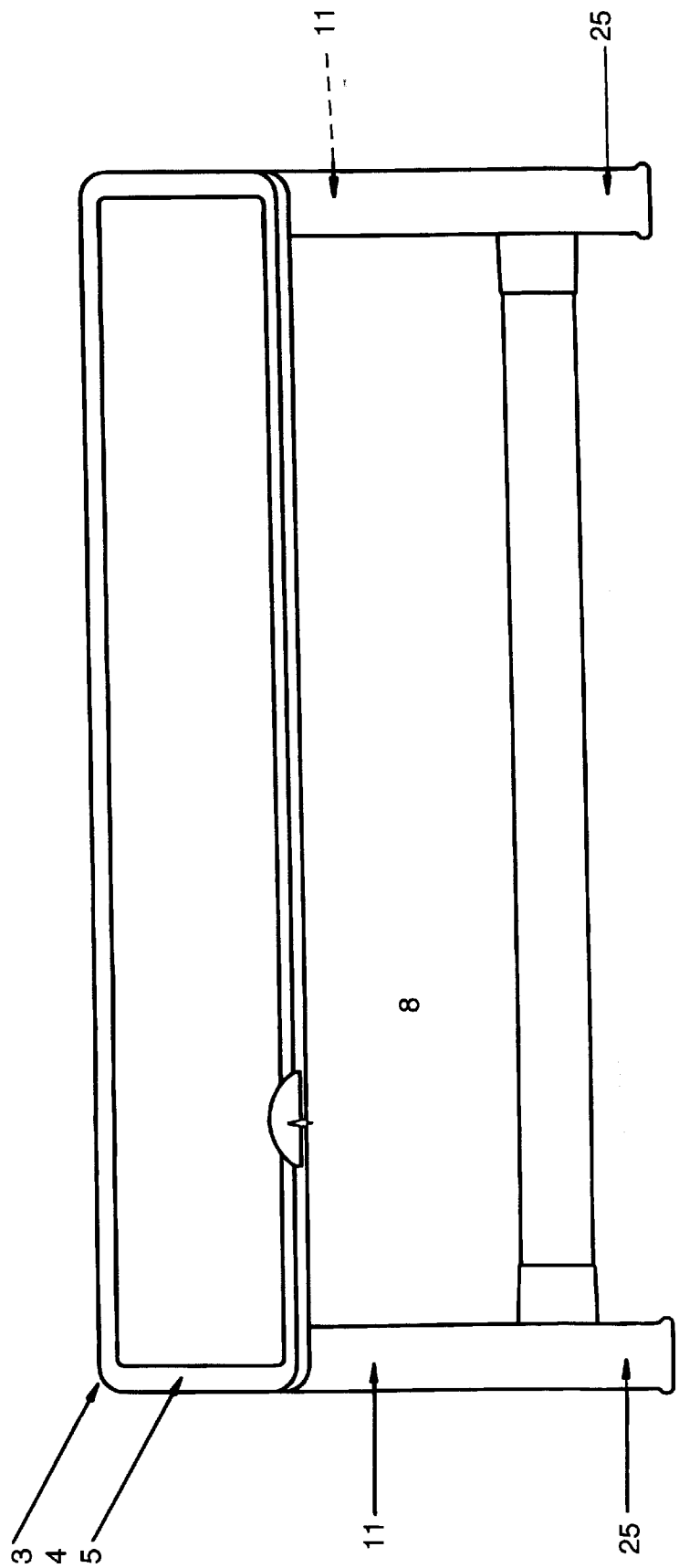
FIGS. 6a and 6b show different views of the same embodiment as shown in FIG. 6.
Figure 6B:
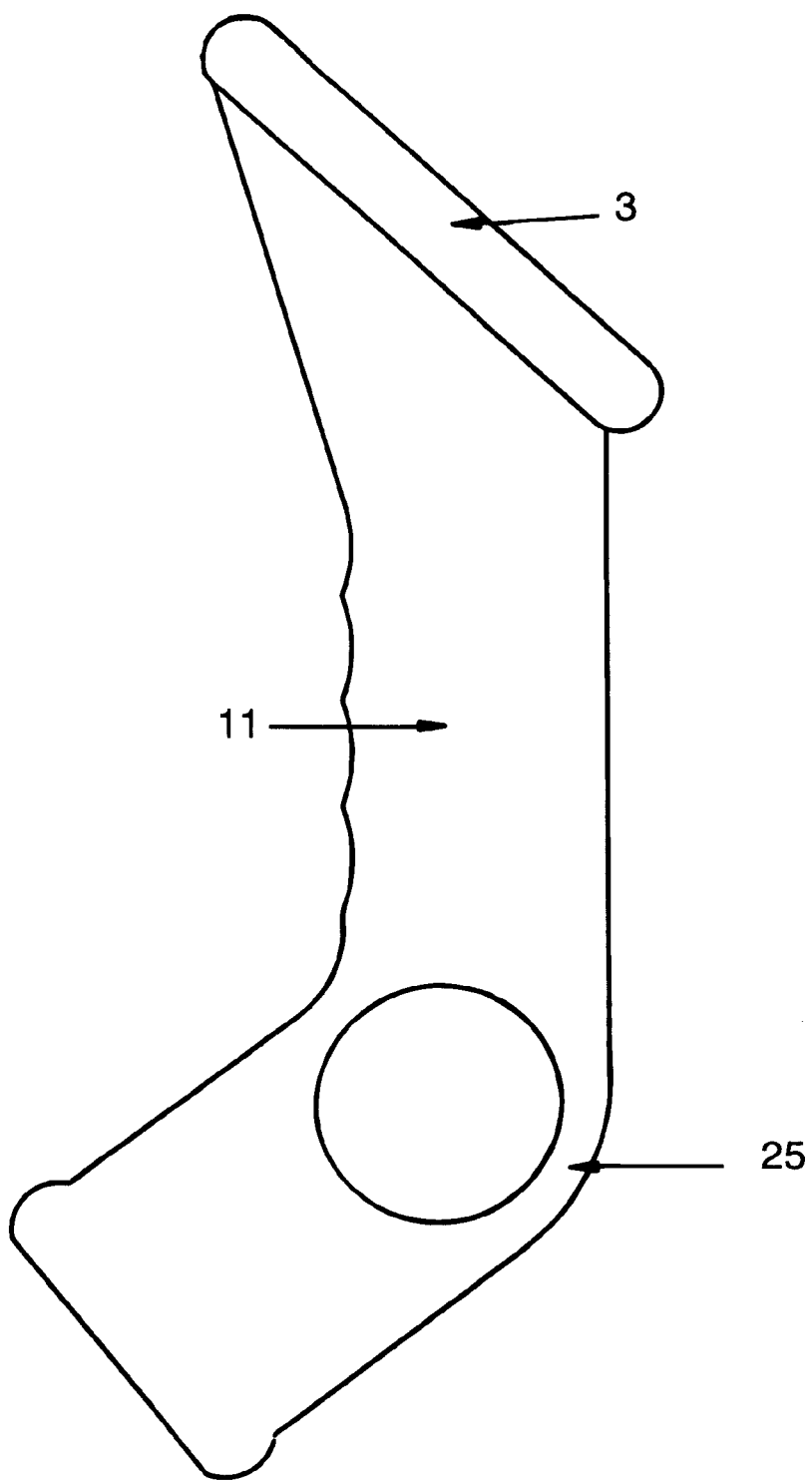
Figure 6C:
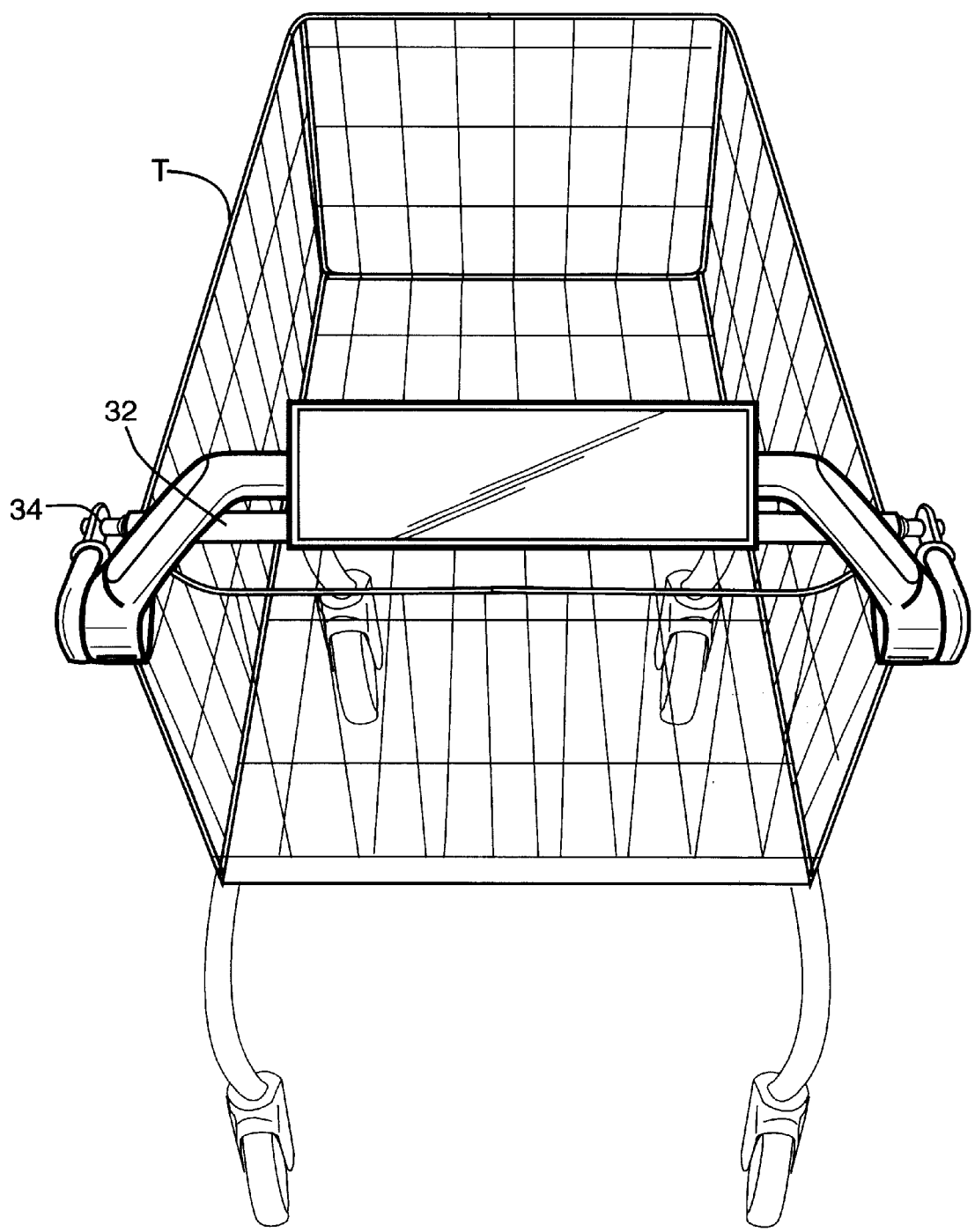
FIG. 6C is a schematic representation of the information and advertising sign of the present invention in combination with a trolley.

As shown in FIGS. 6, 6a and 6b, the bracket (the handles) 11 can be fastened directly to the fastening means for the shopping trolley handles of the shopping trolley T. By substituting the existing fastening means 25 for the trolley handle with an extended version which stretches up, possibly down and forward with a shape and connection to the support element 3 as indicated previously, one will obtain an even better attachment/stability for the bracket 11, and additionally one will obtain a larger distance between the handles 11 on each side of the shopping trolley handle. For example, and as illustrated in FIG. 6C, the trolley handle 32 is secured to the trolley by a handle fastening means 34 to which the handle fastening means 25 of the device may be attached. The actual handle for the shopping trolley will with this solution now be 100% uncovered by the bracket 11. The support element and the two brackets are in this embodiment moulded in one piece, whereby mounting rails as shown in FIG. 2 will be superfluous.

FIG. 7 shows a bracket which consists of two halves of a handle which are bent around the shopping trolley handle and clamped together by means of two or more hooks.

FIGS. 8a and 8b show an extension of the support element 3 that provides space for a separate display surface in addition to the above mentioned surface 4. Both suggestions for an extension consist of a surface having approximately the same design as the above mentioned surface 4, but which is fastened to the support element in the upper edge (FIG. 8a) or as a reinforcement for the support element (FIG. 8b).

The device according to the invention will when utilized, give customers who use shopping trolleys with wheels clear and good information about activities in the shop. For the owners of supermarkets and supermarket suppliers this device will represent a unique opportunity to focus on shopping activities with frequently changing information. The device will also make pushing and steering, i.e. maneuvering, of shopping trolleys with wheels easier, not least for some groups of movement disabled persons.

We claim:

1. A device for placing information/advertising on a shopping trolley having a bar-like handle fastened to the trolley by a handle fastening means, comprising:

an information support element having at least one information display surface and a first bracket directed substantially downwards from said information support element and having a lower end portion for securement to the shopping trolley handle or to the handle-fastening means, said first bracket having an intermediate portion forming a first handle above said lower end portion thereof and adapted to lie above the bar-like handle;

a second bracket directed downwardly from said information support element and spaced from said first bracket, said first and second brackets projecting downwardly adjacent opposite sides of said support element, said second bracket having a lower end portion for securement to the shopping trolley handle or to the handle fastening means and having an intermediate portion forming a second handle above said lower end portion thereof and adapted to lie above the bar-like handle, said brackets between said support element and said lower end portions of said brackets extending distances enabling insertion of an individual's fingers between said lower end portions and said support element to afford solid hand grips by the individual's fingers clasped about said first and second handles and without substantial engagement of the individual's hands with a surface of the trolley handle or said support element, thereby affording ergonomically-shaped handles stably arranged for pushing and steering the shopping trolley.

2. The device according to claim 1 wherein the display surface on the information support element extends on top of the upper ends of the brackets and is spaced above the shopping trolley handle, enabling the trolley for maneuvering by grasping one or another of said handles on said bracket.

3. The device according to claim 2 wherein the information display surface on the information support element is generally rectilinear in shape surrounded on two short sides and two long sides by an upwardly directed protruding edge forming a recess for placing a transparent plastic moulding in protective overlying relation to a sheet-shaped information/advertising strip.

4. The device according to claim 1 in combination with said fastening means, said brackets comprising an integral part of said handle-fastening means.

5. The device according to claim 1 wherein the information support element and the handles are formed integrally and in a generally U-shaped configuration.

6. In combination, a shopping trolley having a bar-like handle fastened to said trolley by a handle fastening means and a device for placing information/advertising on said shopping trolley, said device including an information support element having at least one information display surface and a first bracket directed substantially downwards from said information support element and having a lower end portion secured to said shopping trolley handle or to said handle-fastening means, said first bracket having an intermediate portion forming a handle above said lower end portion thereof, and a second bracket directed downwardly from said information support element and spaced from said first bracket, said brackets projecting downwardly adjacent opposite sides of said support element, said second bracket having a lower end portion for securement to said shopping trolley handle or to said handle fastening means and having an intermediate portion forming a second handle about said lower end portion thereof and above said bar-like handle, said brackets between said support element and said lower end portion of said brackets extending distances enabling insertion of an individual's fingers between said lower end portions and said support element to afford solid hand grips by the individual's fingers clasped about said first and second handles and without substantial engagement of the individual's hands with a surface of said trolley handle or said support handle, thereby affording ergonomically shaped handles enabling said trolley for maneuvering by grasping one or another of said shopping trolley handle and said first and second handles on said brackets.

7. The combination according to claim 6 wherein the display surface on the information support element extends on top of the upper ends of the bracket and is spaced above said shopping trolley handle.

8. The combination according to claim 7 wherein the information display surface on the information support element is generally rectilinear in shape surrounded on two short sides and two long sides by an upwardly directed protruding edge forming a recess for placing a transparent plastic moulding in protective overlying relation to a sheet-shaped information/advertising strip.

9. The combination according to claim 6 wherein said bracket comprising an integral part of said handle-fastening means.

10. The combination according to claim 6 wherein the information support element and the downwardly directed handles are formed integrally and in a generally U-shaped configuration.

* * * * *